United States Patent
Li et al.

(10) Patent No.: US 10,037,297 B2
(45) Date of Patent: Jul. 31, 2018

(54) METHOD OF EXTENDING RANGE OF USB TRANSMISSION FOR ISOCHRONOUS TRANSFER

(71) Applicant: ATEN International Co., Ltd., New Taipei (TW)

(72) Inventors: Xinbo Li, Richmond (CA); Ge Wang, Richmond (CA)

(73) Assignee: ATEN International Co., Ltd., New Taipei (TW)

( * ) Notice: Subject to any disclaimer, the term of this patent is extended or adjusted under 35 U.S.C. 154(b) by 225 days.

(21) Appl. No.: 14/984,370

(22) Filed: Dec. 30, 2015

(65) Prior Publication Data

US 2017/0192922 A1 Jul. 6, 2017

(51) Int. Cl.
*G06F 13/38* (2006.01)
*G06F 13/40* (2006.01)
*G06F 13/42* (2006.01)

(52) U.S. Cl.
CPC ........ *G06F 13/4045* (2013.01); *G06F 13/385* (2013.01); *G06F 13/4068* (2013.01); *G06F 13/4291* (2013.01)

(58) Field of Classification Search
CPC .......... G06F 13/14; G06F 13/20; G06F 13/24; G06F 13/38; G06F 13/4045; G06F 13/385; G06F 13/4068; G06F 13/4291; G06F 13/4282; G06F 13/42; G06F 13/4027; G06F 13/4004; G06F 13/40
See application file for complete search history.

(56) References Cited

U.S. PATENT DOCUMENTS

| | | | | |
|---|---|---|---|---|
| 5,914,877 A | * | 6/1999 | Gulick | G06F 3/162 381/2 |
| 6,191,713 B1 | * | 2/2001 | Ellis | G06F 13/4027 341/100 |
| 6,381,666 B1 | | 4/2002 | Kejser et al. | |
| 6,571,305 B1 | * | 5/2003 | Engler | G06F 13/4045 710/100 |
| 9,104,822 B2 | * | 8/2015 | Fu | G06F 13/4045 |
| 2004/0177197 A1 | * | 9/2004 | McLeod | G06F 13/4045 710/300 |
| 2005/0071733 A1 | * | 3/2005 | Fukae | G06F 13/426 714/776 |
| 2007/0239900 A1 | * | 10/2007 | Beasley | G06F 13/4045 710/2 |
| 2008/0028120 A1 | * | 1/2008 | McLeod | G06F 13/4045 710/313 |

* cited by examiner

*Primary Examiner* — Thomas J Cleary
(74) *Attorney, Agent, or Firm* — Chen Yoshimura LLP

(57) ABSTRACT

A method for extending the range of isochronous USB data transfer, by providing a local extender and a remote extender, coupled respectively to the USB host and the USB device, and coupled to each other via a non-USB cable. After receiving a first In-token from the host, the local extender transmits a first data packet to the host, which contains a data payload having a non-zero length; the data is either generated by the first extender, or previously received from the USB device and stored in a buffer. The local extender forwards the first In-token to the USB device via the remote extender; in response, the USB device generates a second data packet containing requested data and transmits it to the local extender via the remote extender. The local extender stores the second data packet and transmits it to the host in response to a second In-token from the host.

9 Claims, 4 Drawing Sheets

METHOD OF EXTENDING RANGE OF USB TRANSMISSION FOR ISOCHRONOUS TRANSFER

BACKGROUND OF THE INVENTION

Field of the Invention

This invention relates to USB (Universal Serial Bus) transmission method, and in particular, it relates to a method of extending the transmission range between USB host and USB devices for isochronous transfer.

Description of Related Art

Data transmission between electronic devices using the USB protocol has a limited range, typically a few meters. Extender devices that can extend the range of USB data transmission have been described. For example, U.S. Pat. No. 6,381,666 describes "a method and apparatus to be used to extend the range of a standard USB devices. An extended range hub is provided which comprises a Local Expander (LEX) and a Remote Expander (REX) which can be separated by up to, for example 100 meters." (The U.S. Pat. No. 6,381,666, Abstract.) This patent explains that the main reason for the limited transmission range is the requirement that "when the Host Controller instructs a particular device to place its information onto the shared bus, the requested information must be received by the Host Controller within sixteen (16) 'bit-times' of said Host Controller issuing said instruction. In practise, this ensures that the USB Specification provides for a high efficiency of bandwidth utilization by limiting the period during which no information is being transmitted. However, these requirements also limit the physical range of USB devices . . . " (Id., col. 2, lines 17-43.) The U.S. Pat. No. 6,381,666 describes a method for transmitting an isochronous USB data stream between a host controller and a peripheral device over an extended distance which includes the following steps: "a. feeding a first original, outgoing digital signal from a host controller to a local expander unit, and in response to determining that the local expander unit does not already possesses data requested by said outgoing digital signal, delivering a synthetic data packet having a payload of zero length to the host controller; b. transmitting said outgoing digital signal as an outgoing transmission signal, over a signal distribution system; c. receiving said outgoing transmission signal as a first original outgoing digital signal at a remote expander unit; d. delivering said first original outgoing digital signal from said remote expander to at least one peripheral device; e. receiving, at said remote expander, a reply digital signal from said at least one peripheral device; f. transmitting said reply digital signal as a reply transmission signal over said signal distribution system; g. receiving said reply transmission signal as a reply digital signal at said local expander; h. storing said reply digital signal as a stored reply digital signal until the receipt of a subsequent original, outgoing digital signal from said host controller, which subsequent signal is the same as, or similar to, said first original outgoing digital signal; and i. forwarding said stored reply digital signal to said host controller in response to said subsequent original outgoing digital signal." (Id., claim 1 of the reexamined patent; see also FIG. 12, FIG. 9.) The synthetic data packet containing a zero length payload mentioned in step a. can be used to satisfy the timing requirements of the USB protocol while causing no disturbance to the actual information being carried by the protocol. (Id., col. 15, lines 58-63.) The U.S. Pat. No. 6,381,666 describes two other methods for transmitting an isochronous USB data stream; in these two methods, in response to determining that the local expander unit does not already possesses data requested by said outgoing digital signal, the local expander transmits no response, or transmits a negative acknowledgement packet (NaK) to the host controller (see Id., FIG. 8 and FIG. 19, respectively).

SUMMARY

The present invention is directed to a method and related apparatus for extending the transmission range of isochronous USB transmission.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method of extending the transmission range between a USB (Universal Serial Bus) host and an isochronous USB transmission device for isochronous data transfer, which includes: (a) providing a first extender device coupled to the USB host via a first USB cable; (b) providing a second extender device coupled to the isochronous USB transmission device via a second USB cable; (c) coupling the first and second extender devices to each other via a non-USB cable; (d) the USB host transmitting a first request for data; and (e) in response to receiving the first request for data, the first extender device transmitting a first data packet to the USB host, the first data packet containing a data payload having a non-zero length, wherein the data payload is either data generated by the first extender device, or data that was previously received from the isochronous USB transmission device from a previous data communication session and stored in a buffer of the first extender device.

In another aspect, the present invention provides a method for isochronous data transfer implemented in a USB (Universal Serial Bus) data transmission system, the system including a USB host, an isochronous USB transmission device, a first extender device coupled to the USB host via a first USB cable, a second extender device coupled to the isochronous USB transmission device via a second USB cable, the first and second extender devices coupled to each other via a non-USB cable, the method including: (a) the USB host transmitting a first request for data to the first extender device; (b) in response to the first request for data, the first extender device transmitting a first data packet to the USB host, the first data packet containing a first data payload having a non-zero length, wherein the first data payload is either data generated by the first extender device, or data that was previously received from the isochronous USB transmission device from a previous data communication session and stored in a buffer of the first extender device; (c) the first extender device forwarding the first request for data to the second extender device; and (d) the second extender device forwarding the first request for data to the isochronous USB transmission device; (e) the isochronous USB transmission device generating a second data packet in response to the first request for data and transmitting it to the second extender device; (f) the second extender device forwarding the second data packet to the first extender device; (g) the first extender device storing the second data packet in the buffer; (h) the USB host transmitting a second request for data to the first extender device; and (i) in response to the second request for data, the first extender device transmitting the second data packet stored in the buffer to the USB host.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 1:
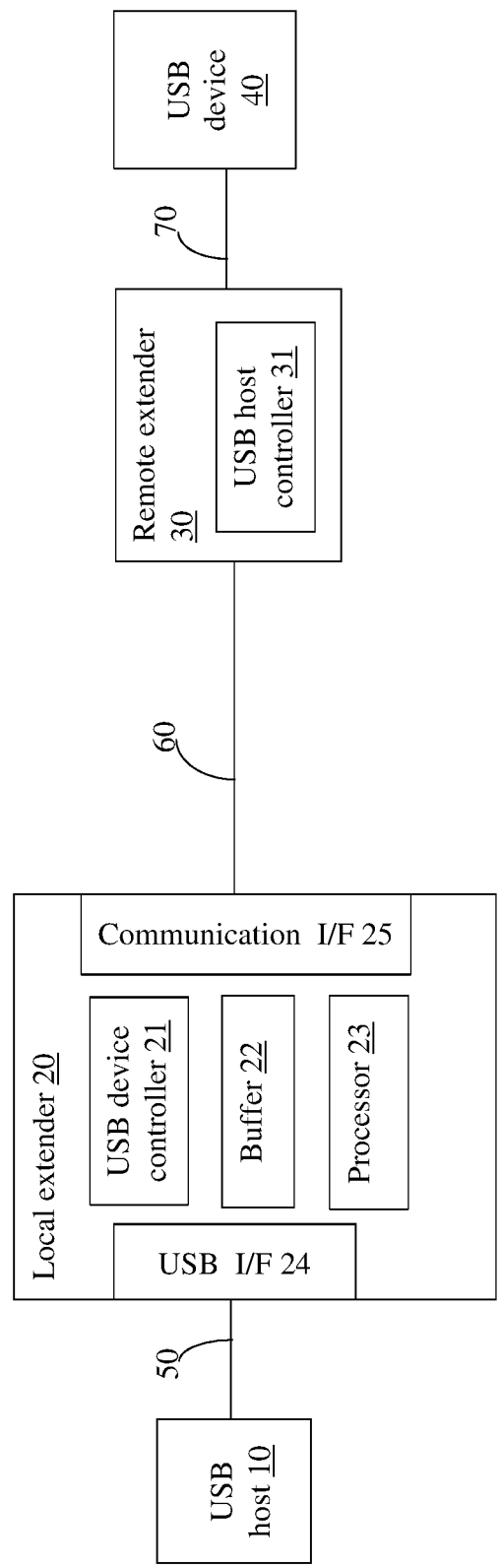
FIG. 1 schematically illustrates a USB extension system according to an embodiment of the present invention.

FIG. 1 schematically illustrates a USB communication system according to an embodiment of the present invention, which enables isochronous USB data transmission over extended ranges. The USB communication system includes a USB host 10 which includes a USB host controller 11, a USB device 40 which includes a USB device controller 41, a first extender device 20, and a second extender device 30. The USB host 10 may be, for example, a personal computer, a server, a game console, etc. The USB device 40 is an isochronous USB transmission device, for example, a game controller, a USB microphone, etc. The first extender 20 is coupled to the USB host 10 via a first USB cable 50, the second extender 30 is coupled to the USB device 40 via a second USB cable 70, and the first and second remote extenders 20 and 30 are coupled to each other by a non-USB communication cable 60 such as a Cat. 5 cable or other cable. For convenience, the first extender 20 is referred to as the local extender and the second extender 30 is referred to as the remote extender.

The lengths of the USB cables 50 and 70 are within the limit according to the USB standard, while the length of the communication cable 60 can be much longer than that specified by the USB standard. Thus, by using the methods described in this disclosure, the distance between the USB host 10 and the USB device 40 can extended beyond the limit specified by the USB standard.

Figure 2:
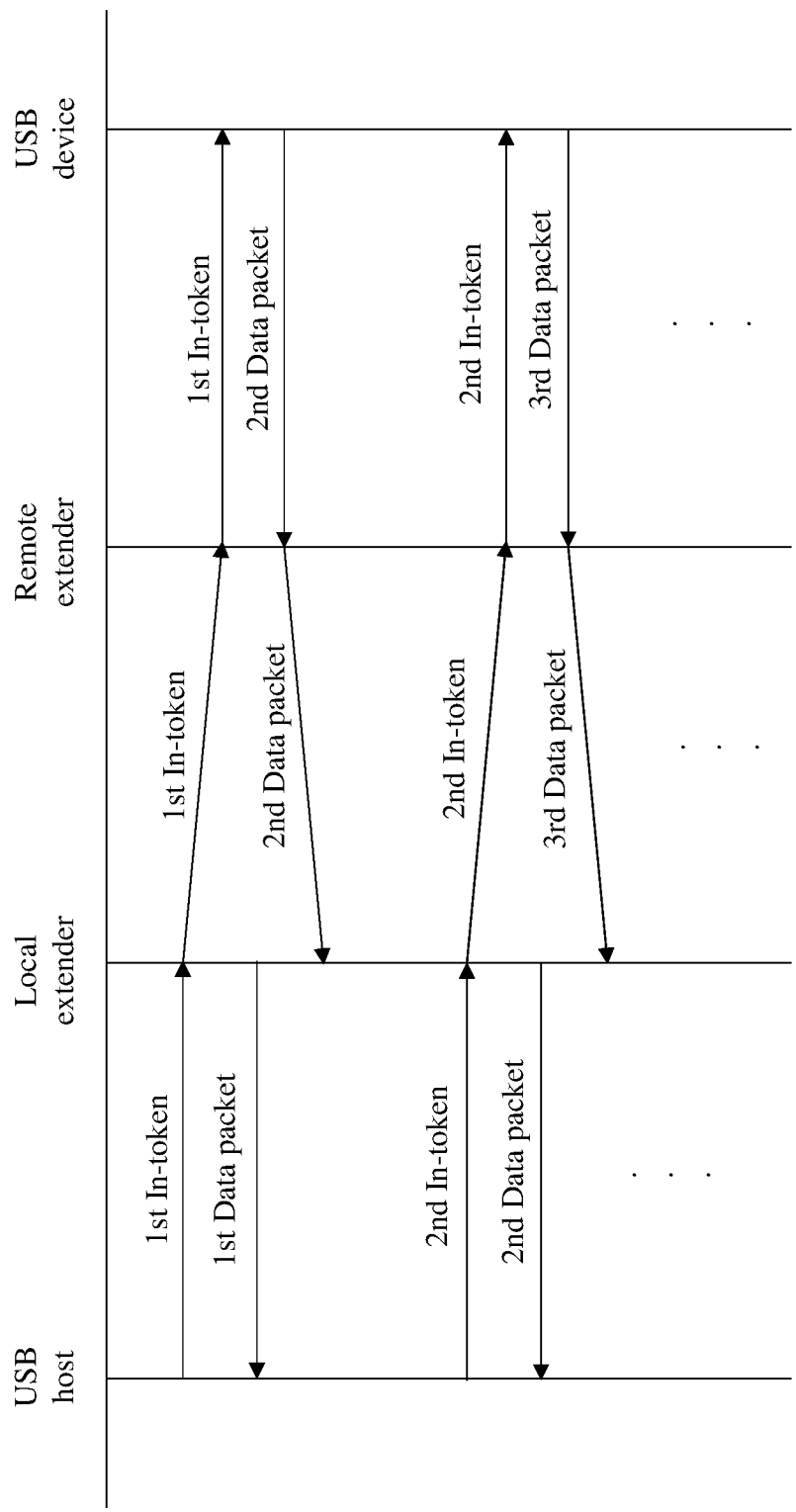
FIGS. 2, 3 and 4 schematically illustrate a USB communication method according to an embodiment of the present invention.

Although only one USB device 40 is shown in FIG. 2, the remote USB extender 30 may include a USB hub that can be coupled to multiple USB devices 40.

The local extender 20 includes a USB device controller 21, which communicates with the USB host controller 11 of the USB host 10 over the first USB cable 50, so that the local extender 20 acts as a USB device with respect to the USB host 10. The remote extender 30 includes a USB host controller 31, which communicates with the USB device controller 41 of the USB device 40 over the second USB cable 70, so that the remote extender 30 acts as a USB host with respect to the USB device 40. The device controllers in the local extender 20 and the remote extender 30 may be implemented in IC (integrated circuit), ASIC (application specific IC), FPGA (field programmable gate arrays), etc.

The local extender 20 further includes a USB interface circuit 24 for transmitting and receiving signals over the USB cable 50, and another interface circuit 25 for transmitting and receiving signals over the non-USB cable 60. The remote extender 30 includes similar interface circuits (not shown).

Figure 3:
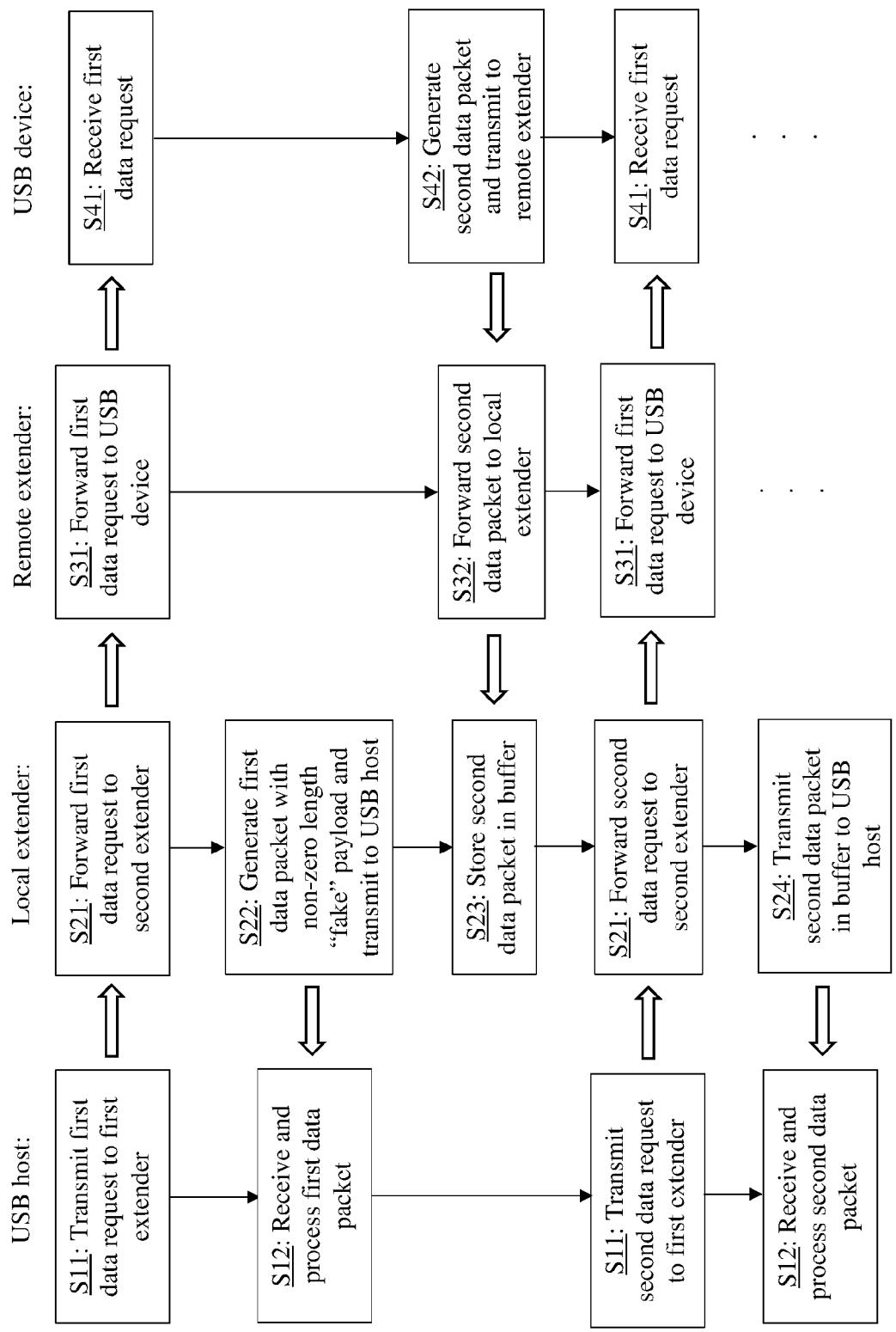

A method of isochronous USB data transmission implemented in the system of FIG. 1 is described with reference to FIGS. 2 and 3. In step S11, the USB host 10 initiates isochronous data transfer by transmitting a first request for isochronous data (an In-token) over the first USB cable 50. The request identifies the USB device as the target device. The local extender 20 forwards the first In-token from the USB host to the remote extender 30 over the communication cable 60 (step S21).

Meanwhile, the local extender 20 responds to the In-token from the USB host 10 by transmitting a first, "fake" data packet to the USB host over the first USB cable 50 (step S22). This response occurs within the time limit required by the USB standard. The fake data packet contains a "fake" payload having a non-zero length; this fake data is obtained by the local extender 20 in a manner described in more detail later. The fake data packet contains a packet identified (PID) at the beginning and a cyclic redundancy check (CRC) at the end. The data contained in the first data packet, which is transmitted by the local extender 20 to the USB host 10 in response to the first In-token, is "fake" in the sense that the data is not supplied by the USB device 40 in response to receiving the In-token. The USB host 10 processes the received first data packet in a normal manner (step S12). In other words, it is irrelevant to the USB device that the data in the first data packet is not generated by the USB device 40.

The remote extender 30 receives the first In-token from the local extender 20, and forwards it to the USB device 40 over the second USB cable 70 (step S31). In response to receiving the first In-token (step S41), the USB device 40 generates a data packet (the second data packet) containing requested data and transmits it over the second USB connection 70 (step S42). The remote extender 30 receives the second data packet and forwards it to the local extender 20 over the communication cable 60 (step S32).

Upon receiving the second data packet from the remote extender 30, the local extender 20 stores the data in its buffer 22 (step S23). When the local extender 20 receives the next data request identifying the same target device (the second data request), issued by the USB host 10 (step S11, repeated), the local extender transmits the data stored in the buffer 22 to the USB host 10 (step S24). The local extender 20 also forwards the second data request to the remote extender (step S21, repeated), and the remote extender 30 and the USB device 40 respond to the second data request by repeating steps S31, S41, S42 and S32. As a result, a third data packet, which is generated by the USB device 40 in response to the second data request, is received by the local extender 20. The local extender 20 stores the third data packet in its buffer step (step S23, repeated). The process continues by repeating steps S11, S24, S21, S31, S41, S42, S32, and S23. Each time, the data packet generated by the USB device 40 in response to the previous data request, which has been stored in the buffer 22, is transmitted to the USB host 10 as a response to the current data request.

In step S22, the data payload in the first (fake) data packet is obtained from the buffer 22 of the local extender 20; the data may be data that is randomly generated by a processor (e.g. a CPU) 23 of the local extender and put into the buffer 22, or it may be data that is left in the buffer from previous isochronous data communication sessions with the same USB device. In the case where the USB device 40 is a microphone, when the microphone is turned on after it has been turned off, the buffer typically contains audio data corresponding to sound that occurred at the end of the previous communication session. In conventional USB microphone devices, the buffer is cleared at the time the microphone is turned on. To implement the method of this embodiment, however, the buffer in the local extender 20 is not cleared, or not completely cleared; rather, the data that remains in the buffer is used to construct the first (fake) data packet in step S22. In isochronous USB data transfer, there is no requirement that the content of the transmitted data be "correct"; the USB host simply requests data and does not verify the "correctness" of the received data. The application on the USB host can process the data that is received, even if some requested data is not received or not correctly received. As mentioned above, the data in the buffer that is used to construct the first data packet in step S22 may be from a previous audio communication session. This generally does not adversely affect the function of the microphone, because the data transmitted to the USB host in the first data packet will cause a noise of a very brief duration (e.g. a few μsec) which is barely audible to the user.

Figure 4:
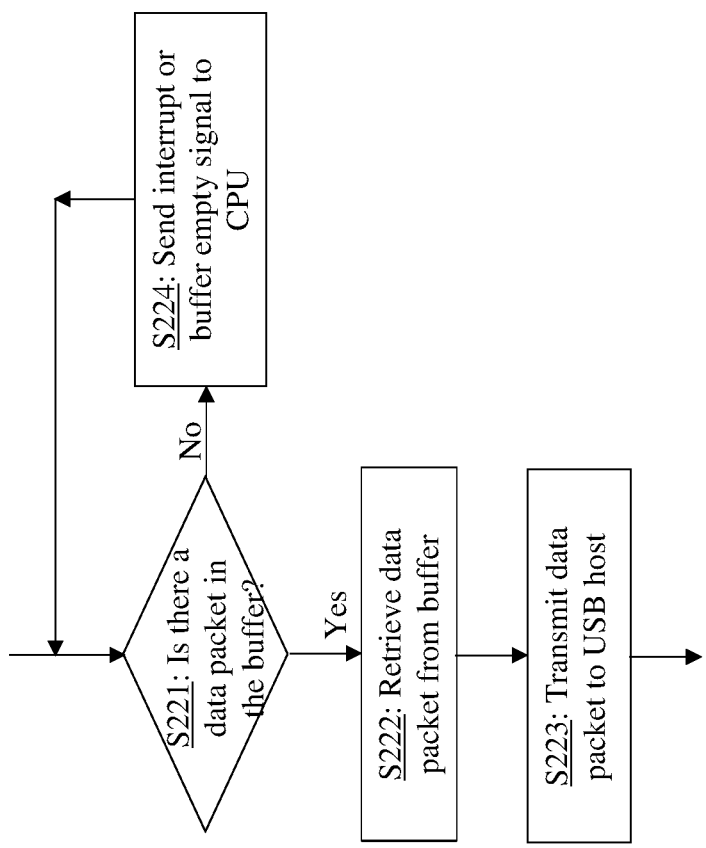

FIG. 4 illustrates the process (step S22) performed by the device controller 21 of the local extender when the local extender receives the In-token from the USB host 10. The device controller 21 examines the buffer 22 to determine whether a data packet from the target USB device (identified in the PID of the In-token) is present in the buffer (step S221). As stated above, the buffer 22 may contain data from the target USB device from a previous communication session. If data is present in the buffer ("yes" in step S221), the device controller 21 retrieves this data and uses it to generate the first data packet (S222), and transmits the data packet to the USB host (step S223). On the other hand, if the buffer 22 does not contain any data from the target USB device ("no" in step S221), the device controller 21 transmits an interrupt signal or a buffer empty signal to the CPU 23 of the local extender 20 to notify it of the buffer empty status (step S224), and returns to step S221 to wait for the data. In response to the interrupt signal or buffer empty signal, the CPU 23 generates a data packet containing a payload of non-zero length, where the payload may be randomly generated data, and stores it in the buffer 22. After the CPU puts the data in the buffer, the device controller 21 performs steps S222 and S223 to transmit the data packet to the USB host.

In an alternative implementation of step S22, the CPU 23 of the local extender monitors the buffer 22 for buffer empty status for the target USB device. If the buffer is empty for the target USB device, the CPU generates a data packet containing a payload of non-zero length and puts it in the buffer. As a result, in step S221, when the device controller 21 examines the buffer 22, the buffer will contain a data packet and the device controller will retrieve it and transmit it to the host in steps S222 and S223.

The process performed by the device controller 21 in step S24 in response to receiving the second In-token from the USB host 10, is in fact identical to that for step S22; but in step S24, because the local 20 extender has previously received the first data packet generated by the USB device 40, in step S221, the buffer will contain data, so the device controller 21 will transmit such data packet to the host.

It is noted that in steps S22 and S24, the functions performed by the device controller 21 of the local extender may in fact be identical to those performed by a conventional USB device controller, i.e., it responds to the In-token from the USB host 10 by retrieving data from the buffer 22 and transmitting it to the USB host. The result of step S22, i.e., transmitting a data packet with fake data payload to the USB host, is achieved because the CPU 23 puts the fake data packet into the buffer if the buffer is empty.

It will be apparent to those skilled in the art that various modification and variations can be made in the method of extending the USB transmission range for isochronous transfer and related apparatus of the present invention without departing from the spirit or scope of the invention. Thus, it is intended that the present invention cover modifications and variations that come within the scope of the appended claims and their equivalents.

What is claimed is:

1. A method of extending the transmission range between a USB (Universal Serial Bus) host and an isochronous USB transmission device for isochronous data transfer of audio and video data, comprising:
   (a) providing a first extender device coupled to the USB host via a first USB cable;
   (b) providing a second extender device coupled to the isochronous USB transmission device via a second USB cable;
   (c) coupling the first and second extender devices to each other via a non-USB cable;
   (d) the USB host transmitting a first request for data; and
   (e) in response to receiving the first request for data, the first extender device transmitting a first data packet to the USB host, the first data packet containing a packet identifier (PID), a data payload having a non-zero length, and a cyclic redundancy check (CRC) code after the data payload which indicates that the data payload is valid, wherein the data payload is either data generated by the first extender device and stored in a buffer of the first extender device, or data that was previously received from the isochronous USB transmission device from a previous data communication session and stored in the buffer.

2. The method of claim 1, wherein step (e) includes:
   a USB controller of the first extender device determining whether the buffer contains a data packet from the isochronous USB transmission device;
   if the buffer contains a data packet from the isochronous USB transmission device, the USB controller retrieving the data packet and transmitting it to the USB host as the first data packet; and
   if the buffer contains no data packets from the isochronous USB transmission device, the USB controller transmitting an interrupt signal or a buffer empty signal to a processor of the first extender device.

3. The method of claim 2, wherein step (e) further includes:
   in response to receiving the interrupt signal or the buffer empty signal from the USB controller, the processor generating a data packet and storing it in the buffer.

4. The method of claim 1, wherein step (e) includes:
   a processor of the first extender device monitoring a buffer empty status of the buffer; and
   if the buffer is empty, the processor generating a data packet and storing it in the buffer.

5. The method of claim 1, further comprising:
   the first extender device forwarding the first request for data to the second extender device;
   the second extender device forwarding the first request for data to the isochronous USB transmission device;

the isochronous USB transmission device generating a second data packet in response to the first request for data and transmitting it to the second extender device;

the second extender device forwarding the second data packet to the first extender device;

the first extender device storing the second data packet in the buffer; and in response to a second request for data received from the USB host, the first extender device transmitting the second data packet to the USB host.

6. A method for isochronous data transfer of audio and video data implemented in a USB (Universal Serial Bus) data transmission system, the system including a USB host, an isochronous USB transmission device, a first extender device coupled to the USB host via a first USB cable, a second extender device coupled to the isochronous USB transmission device via a second USB cable, the first and second extender devices coupled to each other via a non-USB cable, the method comprising:

(a) the USB host transmitting a first request for data to the first extender device;

(b) in response to the first request for data, the first extender device transmitting a first data packet to the USB host, the first data packet containing a packet identifier (PID), a first data payload having a non-zero length, and a cyclic redundancy check (CRC) code after the first data payload which indicates that the first data payload is valid, wherein the first data payload is either data generated by the first extender device and stored in a buffer of the first extender device, or data that was previously received from the isochronous USB transmission device from a previous data communication session and stored in the buffer;

(c) the first extender device forwarding the first request for data to the second extender device; and (d) the second extender device forwarding the first request for data to the isochronous USB transmission device;

(e) the isochronous USB transmission device generating a second data packet in response to the first request for data and transmitting it to the second extender device;

(f) the second extender device forwarding the second data packet to the first extender device;

(g) the first extender device storing the second data packet in the buffer;

(h) the USB host transmitting a second request for data to the first extender device; and (i) in response to the second request for data, the first extender device transmitting the second data packet stored in the buffer to the USB host.

7. The method of claim 6, wherein step (b) includes:

a USB controller of the first extender device determining whether the buffer contains a data packet from the isochronous USB transmission device;

if the buffer contains a data packet from the isochronous USB transmission device, the USB controller retrieving the data packet and transmitting it to the USB host as the first data packet; and if the buffer contains no data packets from the isochronous USB transmission device, the USB controller transmitting an interrupt signal or a buffer empty signal to a processor of the first extender device.

8. The method of claim 7, wherein step (b) further includes:

in response to receiving the interrupt signal or the buffer empty signal from the USB controller, the processor generating a data packet and storing it in the buffer.

9. The method of claim 6, wherein step (b) includes:

a processor of the first extender device monitoring a buffer empty status of the buffer; and if the buffer is empty, the processor generating a data packet and storing it in the buffer.

* * * * *